US012759220B2

(12) United States Patent
Garcia Grau et al.

(10) Patent No.: US 12,759,220 B2
(45) Date of Patent: Oct. 13, 2026

(54) NOZZLE FAILURE PREDICTION AND OBJECT QUALITY DETERMINATION

(71) Applicant: Peridot Print LLC, Palo Alto, CA (US)

(72) Inventors: Marc Garcia Grau, Sant Cugat del Valles (ES); Salvador Sanchez Ribes, Sant Cugat del Valles (ES); Sergi Culubret I Cortada, Sant Cugat del Valles (ES); Sergio Puigardeu Aramendia, Sant Cugat del Valles (ES)

(73) Assignee: PERIDOT PRINT LLC, Palo Alto, CA (US)

( * ) Notice: Subject to any disclaimer, the term of this patent is extended or adjusted under 35 U.S.C. 154(b) by 70 days.

(21) Appl. No.: 18/575,852

(22) PCT Filed: Jul. 15, 2021

(86) PCT No.: PCT/US2021/041857
§ 371 (c)(1),
(2) Date: Dec. 31, 2023

(87) PCT Pub. No.: WO2023/287420
PCT Pub. Date: Jan. 19, 2023

(65) Prior Publication Data

US 2024/0326132 A1 Oct. 3, 2024

(51) Int. Cl.

| | |
|---|---|
| ***B29C 64/112*** | (2017.01) |
| ***B22F 10/85*** | (2021.01) |
| ***B22F 12/90*** | (2021.01) |
| ***B33Y 50/02*** | (2015.01) |
| ***B41J 2/165*** | (2006.01) |
| ***B41J 2/21*** | (2006.01) |

(52) U.S. Cl.
CPC ............ *B29C 64/112* (2017.08); *B22F 10/85* (2021.01); *B22F 12/90* (2021.01); *B41J 2/16579* (2013.01); *B41J 2/2139* (2013.01); *B41J 2/2142* (2013.01); *B33Y 50/02* (2014.12)

(58) Field of Classification Search
None
See application file for complete search history.

(56) References Cited

U.S. PATENT DOCUMENTS

| | | | |
|---|---|---|---|
| 6,547,365 B1 | 4/2003 | Alberto et al. | |
| 2005/0225589 A1 | 10/2005 | Oshima et al. | |
| 2017/0021631 A1 | 1/2017 | Ono | |
| 2017/0151775 A1 | 6/2017 | Klein Koerkamp et al. | |
| 2022/0288921 A1* | 9/2022 | Vinets Alonso | B41J 2/0458 |
| 2023/0321995 A1* | 10/2023 | Dafinoiu | B41J 2/2142 347/14 |

FOREIGN PATENT DOCUMENTS

| | | | |
|---|---|---|---|
| EP | 1790479 A2 | 5/2007 | |
| WO | 2017/196344 A1 | 11/2017 | |
| WO | WO-2021025675 A1 * | 2/2021 | B28B 17/0081 |

* cited by examiner

*Primary Examiner* — Ryan A Jarrett
(74) *Attorney, Agent, or Firm* — Michael Dryja

(57) ABSTRACT

Example implementations relate to determining and correcting for nozzle failure in printheads used for printing objects. One example implementation receives object data for printing an object and predicts a nozzle failure of a nozzle in the printhead which corresponds with a print location of the object. A print quality parameter of the object to be printed without using the nozzle is determined.

20 Claims, 4 Drawing Sheets

NOZZLE FAILURE PREDICTION AND OBJECT QUALITY DETERMINATION

BACKGROUND

Three-dimensional objects may be produced by additive manufacturing processes which generate the object layer by layer using a three-dimensional (3D) printer. Example 3D printers may use printheads to apply binding agents to bind build material particles or fibers of plastic, metal, ceramic or other powders or fibers. This is performed one layer at a time and eventually builds a 3D object.

BRIEF DESCRIPTION OF THE DRAWINGS

Various features of the present disclosure will be apparent from the detailed description which follows, taken in conjunction with the accompanying drawings, which together illustrate features of the present disclosure, and wherein.

DETAILED DESCRIPTION

Figure 1:
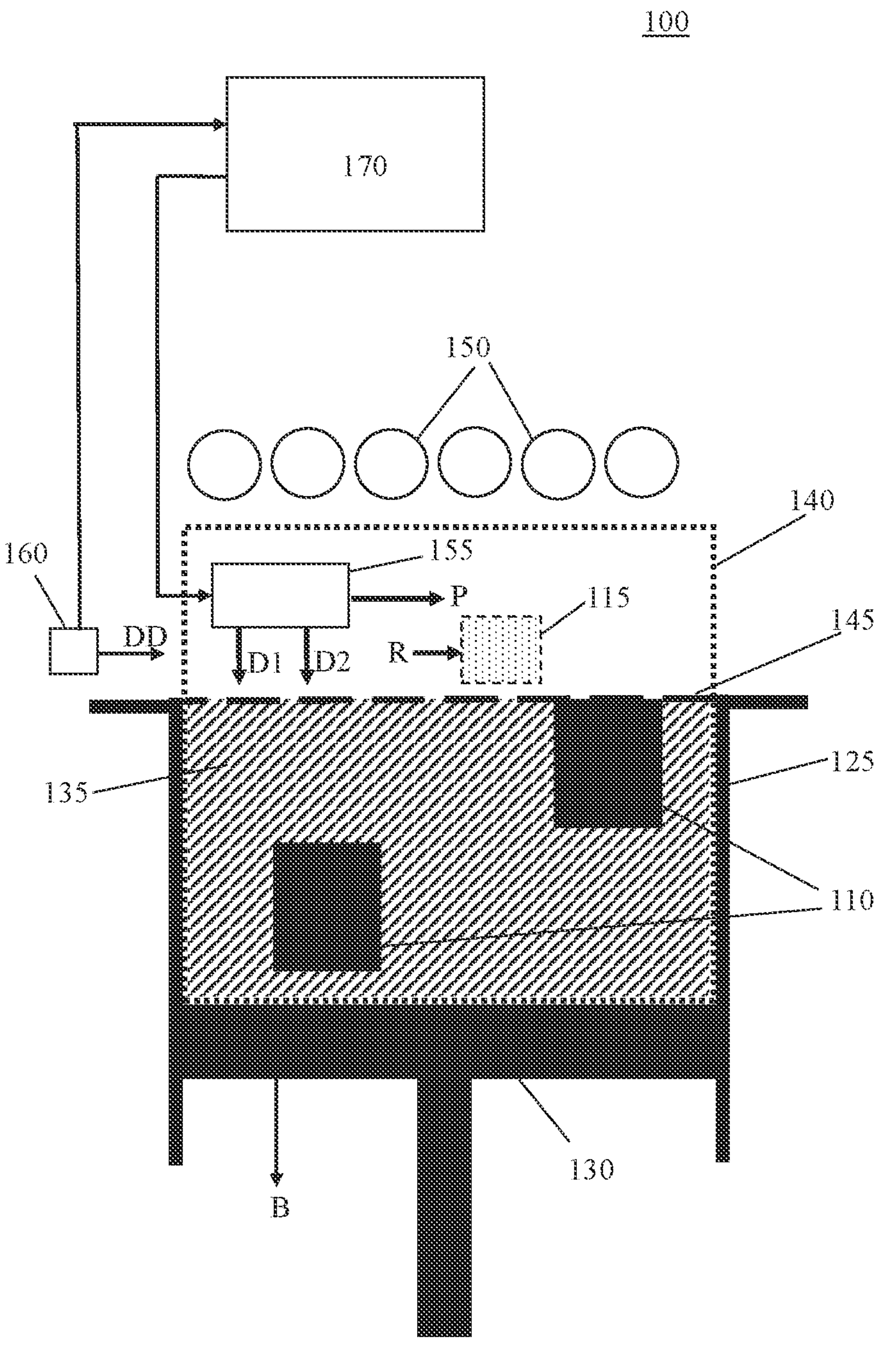
FIG. 1 illustrates an example printing apparatus.

Additive manufacturing machines or printing apparatus make a 3D object through the solidification of a number of layers of a building material. These are based on received object data such as a 3D model of the object to be printed, created for example using a CAD computer application. The object data may be received as or processed into slices, each defining that part of a layer or layers of build material to be solidified in order to create the object. In some examples, the printing apparatus may apply a binding or coalescing agent to a new layer of build material at locations corresponding to the object. The application of energy such as Infrared light to the layer then causes building material having the binding agent to bind together. The binding agent may cause the affected build material to retain more heat from the applied energy to sinter or melt the build material together, or otherwise solidify the build material to form a layer of the object. Alternatively, binding may be achieved by activating the binding agent to chemically fuse with nearby build material, for example to act as a glue or adhesive to bind build material together. Once all layers have been processed, the build material which has not been solidified or bound is removed, for example using a de-caking process, in order to recover the printed object. Further processing of the printed object may include heating or sintering, cooling, and finishing such as polishing, varnishing and coloring.

In an example, a printhead may be used to apply the binding agent. The printhead may scan across the build material layer in both an X (width) and Y (length) axis, or a sufficiently wide printhead may scan along the Y axis only. In an example the printhead has a number of rows of nozzles each arranged to eject a number of drops of binding agent at a particular printing area coordinate which corresponds with a print location of the object.

In some examples of three-dimensional (3D) printing, 3D objects are formed using thermal, piezo, or other printhead inkjet arrays. A layer of build material (e.g. a powder or fibers of plastic, ceramic, or metal) is exposed to a binding or fusing agent which is selectively deposited (or "printed") in contact with a selected region of the build material. The binding or fusing agent is capable of penetrating into the layer of build material and spreading onto the exterior surface of the build material. The fusing agent is capable of absorbing radiation (e.g., thermal radiation, broadly referred herein as heat), which in turn melts or sinters the build material that is in contact with the fusing agent. This causes the build material to fuse or bind to form a layer of the 3D object. In other examples, a chemical binding agent such as water, solvent and Latex may be used. The application of heat energy then encourages the binding together of build material containing the binding agent. Repeating this process with numerous layers of build material causes the layers to be joined together, resulting in the formation of the 3D object.

In some non-limiting examples, the build material may be a powder-based build material, which may include both dry and wet powder-based material, particulate materials, and granular materials. In some examples, the build material may include a mixture of air and solid polymer particles, for example at a ratio of about 40% air and about 60% solid polymer particles. One suitable material may be Nylon 12, which is available for example from Sigma-Aldrich Co. LLC.

Certain examples described herein address a challenge with failure of a nozzle of a printhead which may impact the quality of the printed object. In an example, a prediction of nozzle failure of nozzles that will be used to print the object is made. This may be based on current and historical test data of each respective nozzle, for example using drop detection results before printing of the object begins.

In an example, it is then determined whether failure of any of these nozzles is likely to affect the print quality of the object. The sensitivity of the object to nozzle failure at various locations of the object may be dependent on factors such as the particular part being printed by the nozzle being likely to fail. A small, narrow member may be likely to be affected by a failure of a single nozzle used to print it, whereas a thick, robust part may not be. In an example, this sensitivity may be set by a user and may depend on the ultimate application of the part. For example, robust objects for the automotive industry may be insensitive to a small number of nozzle failures whereas delicate objects used in medical applications may not be.

In cases where the print quality of the object is determined to be below that required, corrective actions may be undertaken before printing the object. For example, the object may be moved to a different print location where there are no or fewer predicted nozzle failures. In other examples, a maintenance routine such as cleaning may be performed on the printhead before printing the object and/or a notification may be sent to a user, for example alerting the user that a new printhead is required.

Determining whether correction action is needed may be based on a print quality parameter falling below a quality threshold. In an example, the print quality parameter may be the number of predicted nozzle failures per unit area of the object. This may be further refined depending on which area of the object is being considered, for example the surface area or an area corresponding to parts of the object below predetermined dimensional limits such as an elongate member having a minimum width, FIG. 1 illustrates one example of a 3D printer system. The 3D printer 100 is used to print a number of objects 110, and comprises a build chamber having build chamber walls 125 and a support member or build platform 130. The build platform 130 supports a plurality of layers of build material 135, and is movable during generation of the 3D object to accommodate each new layer of build material. The movement of the build platform 130 during layer by layer building of the 3D object is shown by arrow D. The build chamber has a build or printing volume 140 which is defined by the build chamber walls and the build platform when in its lowest position. In this example, the build volume 140 will therefore be at or below the top of the build chamber walls 125 when the last layer of build material has been added. For the purposes of the following explanation, a printing area 145 is shown at the level at which a current or next layer of build material 135 is to be solidified. A build material distributor (not shown) is arranged to spread a layer of build material, such as a plastic or metal powder, across the printing area 145.

A printhead 155 with nozzles is arranged to selectively direct or print a binding agent onto the new layer of build material in the printing area. This is illustrated using lines D1 and D2 which show the trajectory of drops from different nozzles in the printhead to the build material in the printing area 145. The printhead 155 scans across the printing area 145 in a number of passes shown with line P. Depending on the width of the printhead 155, this may also scan along a perpendicular axis into and out of the figure. The printhead 155 may comprise at least one row of nozzles and these may be arranged into at least one die. More than one printhead may be used, for example to provide redundancy or for specialist applications where staged delivery of binding and other agents may be required.

The binding agent is a material that causes the build material to solidify, whether by chemical action or to assist with the absorption of applied energy to cause the build material to melt, sinter, fuse or otherwise coalesce and solidify. Example binding agents include combinations of water, solvent, and Latex. Preheating or heating of the build material may be provided using overhead lamps or infrared (IR) emitters 150 which encourage solidification by the binding agent.

A drop detection device 160 printhead 155 may be used to test the functioning of individual nozzles in the printhead 155. In an example, laser beams as indicated by line DD may be used to detect whether a nozzle has properly ejected a drop of binding agent when instructed to do so. This may be determined by monitoring the laser beam for interruptions caused by intersecting drops D1, D2. In another example, the nozzles may fire drops onto a substrate which is then analyzed to identify missing drops corresponding to nozzle failures. However other alternative methods may be employed to determine nozzle failure of individual nozzles within the printhead.

A controller 170 receives drop detection data from the drop detection device 160 and may associate this with respective nozzles and store historical nozzle failure or nozzle out (NO) test results for these individual nozzles. By analyzing this data, it is possible to predict whether each nozzle is likely to fail when printing the next object. For example, a nozzle where drop detection data indicates that all recent drop detection tests have shown nozzle failures is likely to fail at the next use. On the other hand, a nozzle which has failed occasionally over a long period may be much less likely to fail on its next use for printing an object. The controller 170 also controls the printhead 155 and may be used to instruct some corrective action where there is a high likelihood of a nozzle failing and where doing so would cause an unacceptable degradation of the object to be printed using that nozzle. These corrective actions may include instructing a cleaning cycle for the printhead or some other maintenance routine, notifying a user, or moving the object to be printed to another region of the printing area 145. Moving the object changes the printing area coordinates used to print the object in order to use nozzles that are less likely to fail.

FIG. 1 illustrates two objects 110 which have been printed within the build material 135 as well as a third virtual object 115 yet to be printed. In an example it has been determined that nozzles that would be used to print this object 115 are likely to fail and therefore the object has been moved to a new printing location, the movement indicated by line R.

Figure 2:
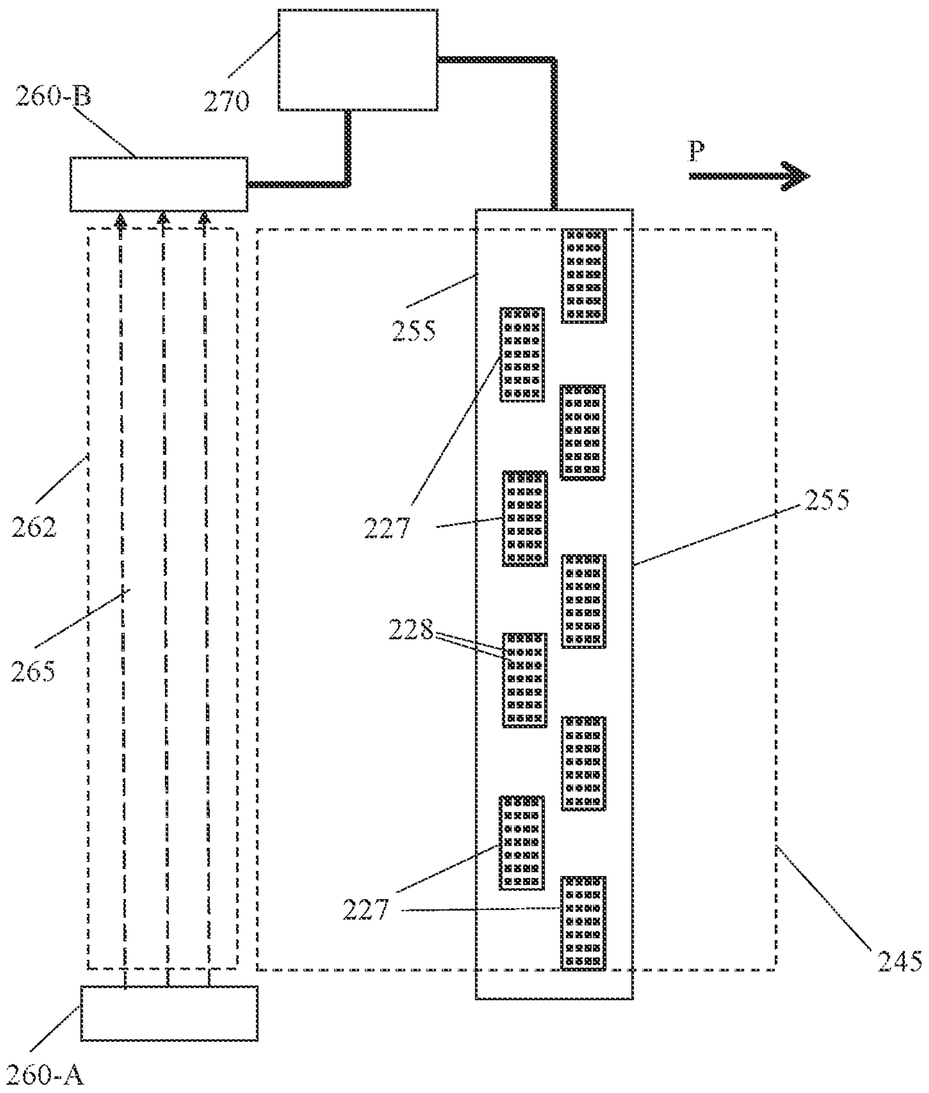
FIG. 2 illustrates an example printhead.

FIG. 2 shows a plan underside view of a printhead according to an example. This shows a Page Wide Array (PWA) printhead 255 or printbar comprising a plurality of dies 227 each die comprising a plurality of nozzles 228. The nozzles are controllably sequenced to eject binding agent drops in accordance with object data so as to collectively form an object. The printhead may advance in a pass direction P across a printing plane 245 corresponding to build material awaiting application of binding agent. Once the pass is completed, the printbar or printhead 255 may return to its starting position and begin a new pass once new building material has been applied to the printing plane or area. Alternatively the printhead may complete passes in both directions, alternating direction for each new layer of build material.

All printed objects correspond with print locations or print area coordinates specifying locations within the print area 245, within each layer, at which build material is to be solidified to form that layer of the object. Individual nozzles also correspond to a number of print area coordinates, in the case of a PWA each nozzle will correspond to a line of print area coordinates. It is therefore possible to determine whether failure of any particular nozzle would impact on an object to be printed. As noted previously, the impact may be negligible or it may be significant enough to cause rejection of the printed object. In some examples there may be more than one row of nozzles in each die, or there may be more than one printhead, in which case a nozzle likely to fail may be replaced by a redundant nozzle covering the same print area coordinates.

The dies 227 are arranged across the printhead 255 to ensure nozzle coverage across the full width of the print area 245. In some examples, the dies may be offset, staggered, and overlap as shown. It has been found that nozzles are more likely to fail at the ends of the dies and the overlapping arrangement therefore provides nozzle redundancy in these areas.

A drop detection area 262 is shown adjacent the print area 245 and may receive the printhead 255 for nozzle testing. A drop detection apparatus 260-A, 260-B has a laser unit 260-A which directs a number of lasers 265 across the drop detection area 262 to a laser detection unit 260-B. The nozzles may then be fired and drop detection confirmed by interruption of a correspondingly located laser 265. Failure to detect this interruption indicates nozzle failure or NO. The printhead may be tested periodically or before each print job. The drop detection data for each nozzle may be provided to a controller 270 for further processing.

Figure 4:
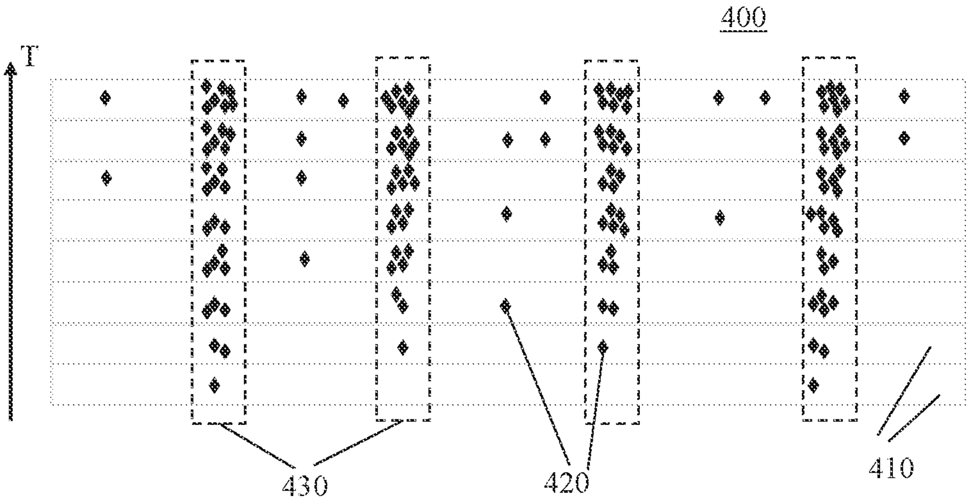
FIG. 4 illustrates drop detection according to an example.

Another drop detection method is illustrated in FIG. 4. This uses a substrate such as paper to identify nozzles that have failed. The substrate 400 is shown with a number of bands 410 which correspond to different test times, with more recent test results advancing in direction T. Marks 420 indicate coordinates on the substrate where a nozzle has failed to deliver a binding agent or other drop of liquid. The first band 410 (bottom) corresponds to a new printhead and the last band (top) corresponds to the printhead nearing end of life. It can be seen that as the printhead ages, more and more NO conditions are recorded. It can also be seen that the number of NO conditions is highest at the ends of the dies which are indicated by the dashed zones 430.

In using this type of drop detection, the print apparatus may scan the substrate 400 to identify nozzles that have failed at each testing time or band 410. Individual nozzle failures may be identified from marks 420 corresponding to the location of the nozzle. The marks 420 may correspond to a lack of binding or some other testing agent on the substrate. The marks may also be considered nozzle positions where a nozzle failure has been recorded, for example using a paper drop detection test, a laser-based drop detection test, or some other method.

This historical NO data for each individual nozzle may then be used to predict the likelihood that an individual nozzle will fail when next used. For example, it can be seen, towards the top of the substrate, that some nozzles have repeatedly failed over recent tests, whereas other nozzles have not yet failed or may have failed intermittently. This information can be used to make NO predictions for each nozzle.

In other examples, the failure of groups of nozzles may be considered. For example, a group of nozzles may provide redundancy in case one nozzle in the group fails, or the group of nozzles may each be arranged to apply some of the binding agent or even a stagged combination of different binding agents. For example referring again to FIG. 2, each die comprises four rows of nozzles and each group may be one nozzle wide. In this case, the marks 420 may indicate that all nozzles in a group have failed or the marks may indicate that a reduced amount of binder agent is being applied by that group which may then be used to predict failure of the whole group.

Figure 3:
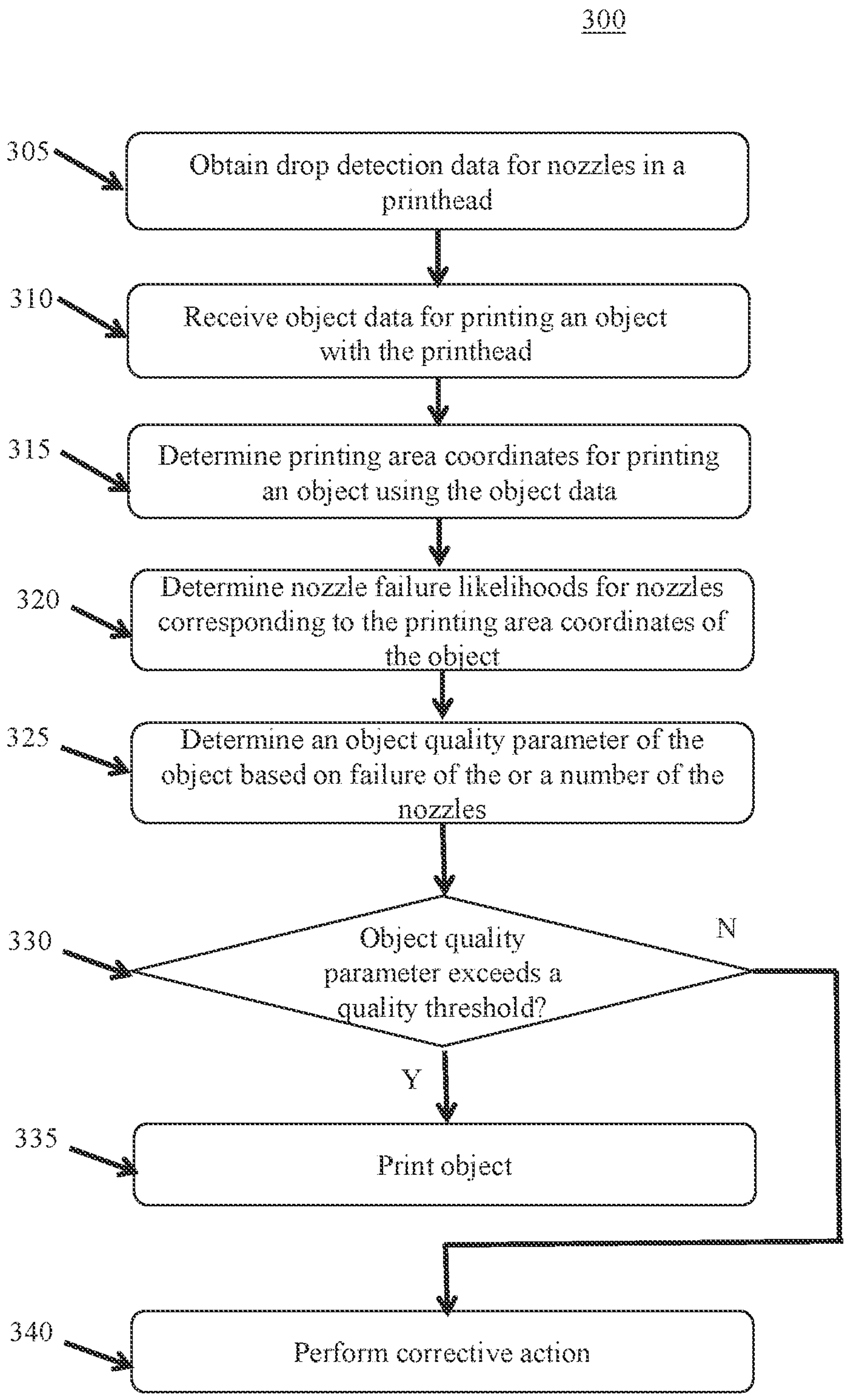
FIG. 3 is a flowchart of an example method of determining object quality based on nozzle failure likelihoods in a printhead according to an example.

FIG. 3 illustrates a method of printing 3D objects according to an example. This may be implemented by a printer apparatus according to FIG. 1, 2 or 5, for example controlled by controller 170, 270, 500. The method 300 illustrates part of a process for printing a 3D object according to received object data.

At 305, the method obtains drop detection data for nozzles in a printhead. This may be achieved using an optical drop detection unit of the type previously described or analyzing a drop detection substrate similar to that of FIG. 4. Another nozzle failure or NO detection method is to print using all nozzles across a print area onto a substrate such as paper. White lines corresponding to a nozzle indicate continuous nozzle failures over the test period. Dashed lines indicate intermittent failures of the nozzle over the test period, and may indicate for example that the nozzle has a 50% chance of failing when next used. Other nozzle failure likelihood values for respective individual nozzles may be determined using this or other methods of determining nozzle failure likelihood. A continuous line of binding agent or some other test liquid indicates that the corresponding nozzle is working normally and therefore unlikely to fail when next used. A manual visual method may be employed, or an automated scanning of a substrate may be employed to identify nozzle failures. Any other suitable method for determining nozzle failure of individual nozzles, or groups of nozzles, may be employed.

The drop detection data relates to the operational performance of individual nozzles over time and may be stored as a historical series of drop detection test results over a common timeframe. A history of nozzle failures on every test within a recent time period is indicative that the nozzle is likely to fail the next time it is used, and therefore may correspond to a high nozzle failure likelihood. By contrast a nozzle associated with a low number of occasional nozzle failures may be associated with a low nozzle failure likelihood. The nozzle failure likelihood value for respective nozzles may be converted into a binary prediction of whether the nozzle will fail or not the next time it is used—for example a nozzle failure likelihood above 50% may correspond to predicting nozzle failure the next time the nozzle is used. Alternatively, the nozzle failure likelihood may be retained as a likelihood value for use in subsequent processing.

At 310, the method receives object data for printing an object using the printhead. In an example, this object data may be in the form of an object model generated using a CAD package, such as stereolithography (STL) files. This may be converted into a file format where the object is represented as layer-by-layer instructions so that the object data can be followed by a printing apparatus to generate the object. Object data may be generated to print more than one object in the same build volume. The virtual objects for printing may be arranged within the build volume according to any suitable method, ensuring for example that there is sufficient space between objects and/or that they may be optimally located according to some other criteria. For example, a cost function may be used which represents object volume within certain zones of the total build volume and objects moved to minimize this function. These zones may correspond to edges or corners of the build volume where there is a greater likelihood of deformation of the objects, and/or they may correspond to characteristics of the printer apparatus such as the ends of the dies on the printhead.

At 315, the method determines printing area coordinates for printing the object using the object data. Once processed, objects defined by the object data will correspond to a set of printing area coordinates for each layer of the object. These printing area coordinates will define an area of each layer within the printing area at which binding agent is to be applied in order to solidify build material for the object. The next layer may have the same or different printing area coordinates and will correspond to an area of this next layer to which binding agent is applied. The printing area coordinates will also correspond to nozzles in the printhead used to apply binding agent at that printing location. A nozzle failure of a nozzle used to apply binder at a particular printing area coordinate will therefore result in no or reduced binding agent at that printing location which may have a negative impact on the object being printed.

At 320, the method determines nozzle failure likelihoods for nozzles corresponding to the printing area coordinates of the object. This may be achieved by matching the printing area coordinates of the object for a particular layer with the nozzles allocated to those coordinates. This process may be repeated for each layer of the object. The nozzle failure likelihood for each nozzle identified to be used to print the object may then be derived from the drop detection data or other nozzle failure testing data. The nozzle failure likelihood for each identified nozzle may then be determined using its own individual historical test result data, for example using an equation applied to a time series of data for that nozzle.

An example equation is shown below, although alternative equations and other methods may be used for obtaining a nozzle failure likelihood for each identified nozzle; these may extend to pattern recognition and AI treatments for example. The nozzle failure likelihood may simply be in the form of a prediction as to whether or not the nozzle will fail when printing a layer of the object. Alternatively the nozzle failure likelihood value may be retained. In an example, a nozzle out NO prediction at time i may be obtained from:

$$NO_i = \max\left(D_i, e^{-b(L)\cdot m\cdot D_m}\right),$$

Where:

$NO_i$ is the nozzle failure likelihood for the next drop or nozzle activation $D_i$ is detection of NO at the most recent Drop Detection i $D_m$ is the last NO, where m is the number of preceding sampling periods b is a parameter that could be changed based on the printhead life (for example the printhead is old, having a NO will be "remembered" for longer)

L is a parameter based the type of binder agent and the amount of agent ejected by the nozzle.

It can be seen from this particular equation, that the prediction of a failure is most heavily influenced by recent failures and that the more distant the last failure the lower the likelihood of nozzle failure at its next use. This is simply one example of a prediction mechanism that could be used based on historical drop detection data of individual or groups of nozzles. Any other suitable equation or prediction method may alternatively be employed.

Nozzle failure likelihood may also be affected by the location of the nozzle in the printhead. For example nozzles located near the ends of a die may have their calculated nozzle failure likelihood more heavily weighted than nozzles in the center of a die, leading to a higher likelihood than would otherwise have been the case.

At 325, the method determines an object quality parameter of the object based on the failure of the, or a number of, nozzles that would be used to print the object. The object quality parameter may vary depending on the nature or intended use of the object. The object quality parameter may also be based on a single layer, for example the most impacted layer, or the object as a whole. As with the nozzle failure likelihood, the object quality parameter may be a binary value such as "fail" or "pass", or a value representing the expected quality of the object should the nozzles fail may be retained.

Example object quality parameters include: a percentage of nozzle failures in a single layer of the object; a percentage of nozzle failures over the entire object; a number of nozzle failures per unit area. This may be further refined depending on which area of the object is being considered, for example the surface area or an area corresponding to parts of the object below predetermined dimensional limits such as an elongate member having a minimum width. Where two or more nozzles are used to apply binder agent at a single print area coordinate, the predicted failure of one of these nozzles may be included in the number of nozzle failures per unit area but as a fractional amount, where several such instances may combine to be considered a whole nozzle failure.

At 330, the method determines whether the object quality parameter exceeds a quality threshold. The quality threshold may be dependent on the nature and intended use of the object. For example, the quality of objects with fine parts will be more sensitive to nozzle failures whereas the quality of robust parts will be less sensitive. Therefore, a robust part may tolerate a greater number of nozzle failures before it is negatively impacted, whereas a delicate part may be negatively impacted by a single nozzle failure.

A user of the printing apparatus may set the level of sensitivity to nozzle failure, and hence the quality threshold against which the object quality parameter is compared. This may be based on the object's robustness to nozzle failure as noted above. It may also depend on the user's tolerance of object defects and/or yield (the proportion of objects retained/rejected).

If the object quality parameter exceeds a quality threshold, as predetermined or set by a user, the method proceeds to 335 where the object is printed. If on the other hand the object quality parameter does not exceed the quality threshold parameter, the method proceeds to 340 where a corrective action is performed.

The corrective action may be to initiate a maintenance routine such as cleaning the printhead. The object may then be printed, or new drop detection data gathered, and the process repeated to determine whether or not the object can now be printed. Another corrective action may be to notify a user that the printhead needs replacing. This may occur for example, after a cleaning routine has failed to allow printing of the object to occur. Another corrective action may be to engage a redundant nozzle, where available, to replace the failing nozzle.

A further or alternative corrective action may be to relocate the object within the build volume so that a different set of nozzles are used to apply binding agents. That is the object is moved to a new print location with a different set of print area coordinates and hence nozzles are used. This may result in a significantly lower number of nozzle failures allowing the object to be printed. Relocation of the object may be achieved randomly, with the method then repeated to determine whether predicted nozzle failures of the nozzles associated with its new position would negatively impact its quality. If not, the object may then be printed, or if the object quality parameter still remains too low, the object may be relocated again. Alternatively, predicted nozzle failures may be analyzed to determine a region of the print area which is associated with nozzles having a low nozzle failure likelihood, and the method repeated.

It has been noted that nozzle failures are most likely to occur at the ends of dies in the printhead and therefore an object may be relocated to a region of the print area corresponding to the central part of a die, in order to avoid the die ends.

Figure 5:
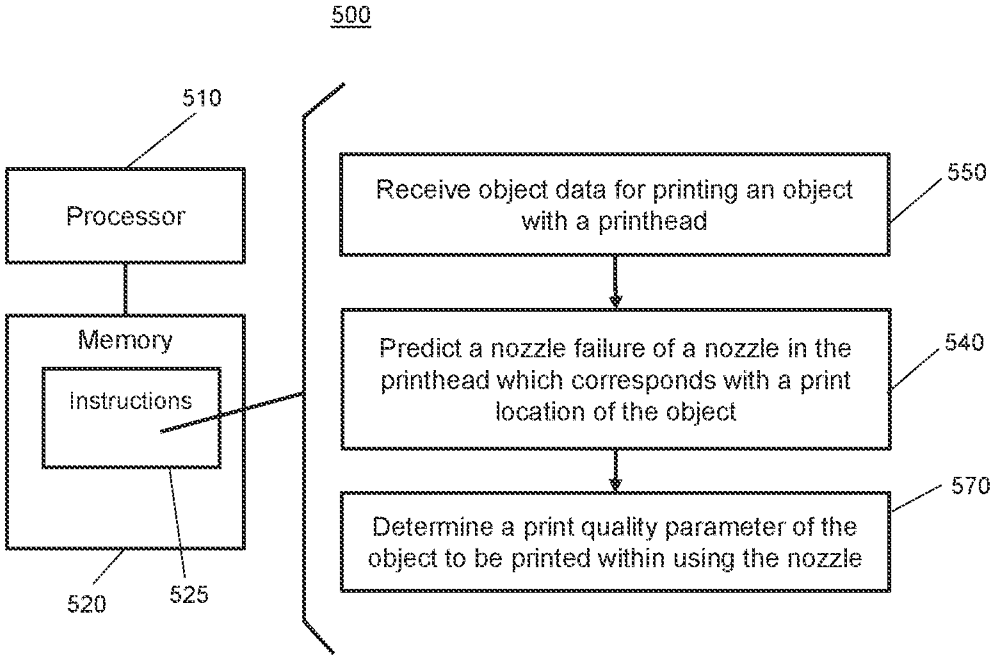
FIG. 5 illustrates an example controller.

FIG. 5 shows a controller 500 which may be used to control a printing apparatus according to an example. The controller 500 comprises computer-readable storage medium 520, which may be arranged to implement certain examples described herein. The computer-readable storage medium 520 comprises a set of computer-readable instructions 525 stored thereon. The computer-readable instructions 525 may be executed by a processor 510 connectably coupled to the computer-readable storage medium 520. The processor 510 may be a processor of a printing system similar to printing system 100.

Instruction 550 instructs the processor 510 to receive object data for printing an object with a printhead. The object data may be download from the cloud, another module within a printing apparatus using the controller, or generated within the controller 500. The object data may be in the form of instructions which can be used by a printing apparatus to print an object layer by layer.

Instruction 560 instructs the processor 510 to predict a nozzle failure of a nozzle in the printhead which corresponds with a print location of the object. In an example, the print location may correspond to print area coordinates used by a printing apparatus to determine where binding agent should be applied to build material in the printing area in order to form the object. Different nozzles of the printhead will be associated with different print locations and so it is possible to make predictions about the likelihood of nozzle failure of the nozzles that will be used to print the object. These predictions may be based on historical drop detection tests for each nozzle, or other using other nozzle performance monitoring and assessment methods.

Instruction 570 instructs the processor 510 to determine a print quality parameter of the object to be printed using the nozzle(s). This print quality parameter will be affected by nozzle failures, for example a large number of predicted nozzle failures may result in lowering the print quality parameter below a threshold which may be used to prevent printing of the object. In this case various corrective actions may be performed to enable printing of the object to commence.

Whether or not printing starts may depend on a combination of the likelihood of a number of nozzles failing and its impact of the object quality parameter. For example, the object quality parameter may be more heavily weighted by nozzle failure at certain locations and less so at others.

In an example, the object to be printed may be a 3D plastic or metal object.

Certain examples allow a user of a printing apparatus to have a greater confidence that the object will be printed to a certain quality and is less likely to be negatively impacted by nozzle failures in the printhead. This may be the case even where the printing apparatus is not flagging a high number of nozzle failure conditions. Predicting the likelihood of individual nozzle failures and determining whether these will impact an object to be printed can be used to reduce the incidence of failed objects and allows for the performance of corrective actions before printing the object, such as cleaning or relocating the object so that nozzles which are less likely to fail may be used to print the object. This approach significantly reduces the likelihood of impactful nozzle failures during object printing. This in turn leads to greater user confidence in a printing apparatus according to some examples.

Certain examples also address situations where a user of a printing apparatus prints the same objects continuously in a "production mode", resulting the same nozzles being used, whilst over nozzles may be underutilized. The heavily utilized nozzles are more likely to fail over time and the ability to identify when this is likely to occur and as a result relocate the objects in the building volume may allow the production mode printing to continue without the need to replace the printhead.

Some examples also allow a user to configure the printing apparatus depending on the application, for example by allowing for a higher tolerance to nozzle failure when the quality of the objects is less important or the nature of the objects means that they will be less affected by nozzle failures.

The use of nozzle failure histories of individual nozzles also allows for improved predictions of nozzle failure for that nozzle. This in turn can reduce the likelihood of object failures and/or improve the ability to take appropriate corrective actions.

Whilst some examples have been described with respect to the application of binder agents by a printhead, certain examples may also be applicable to the application of fusing or coalescing agents by a printhead and where solidification is caused by subsequent application of radiation to build material containing the fusing agent.

The preceding description has been presented to illustrate and describe examples of the principles described. This description is not intended to be exhaustive or to limit these principles to any precise form disclosed. Many modifications and variations are possible in light of the above teaching. It is to be understood that any feature described in relation to any one example may be used alone, or in combination with any features described, and may also be used in combination with any feature of any other examples, or any combination of any other examples.

What is claimed is:

1. A method comprising:

providing object data for an object to be additively manufactured by a three-dimensional (3D) printer having a printhead;

before initiating additive manufacture of the object by the 3D printer in a layer-by-layer process:

predicting a nozzle failure of a nozzle in the printhead corresponding to a print location of the object;

determining a print quality parameter of the object upon the additive manufacture by the 3D printer, based on the predicted nozzle failure of the nozzle;

in response to determining that the print quality parameter is above a quality threshold, proceeding to initiate the additive manufacture of the object by the 3D printer in the layer-by-layer process in accordance with the object data; and in response to determining that the print quality parameter is below the quality threshold, performing a corrective action instead of proceeding to initiate the additive manufacture of the object by the 3D printer in the layer-by-layer process in accordance with the object data.

2. The method of claim 1, further comprising, in response to determining that the print quality parameter is below the quality threshold, and after performing the corrective action, initiating the additive manufacture of the object by the 3D printer in the layer-by-layer process in accordance with the object data.

3. The method of claim 1, wherein the corrective action is one or more than one:

a change the print location of the object when the object is additively manufactured once the additive manufacture of the object by the 3D printer in the layer-by-layer process has been initiated;

a maintenance procedure;

user notification; and usage of a redundant nozzle when the object is additively manufactured once the additive manufacture of the object by the 3D printer in the layer-by-layer process has been initiated.

4. The method of claim 1, wherein the quality threshold is set by a user.

5. The method of to claim 1, wherein predicting the nozzle failure comprises performing drop detection for the nozzle.

6. The method of claim 5, wherein predicting the nozzle failure comprises using current results and historical results of the drop detection for the nozzle.

7. The method of claim 6, wherein the nozzle failure is predicted as a maximum of the current results of the drop detection for the nozzle and a function that is based on the historical results of the drop detection for the nozzle.

8. The method of claim 7, wherein the function is based on the historical results of the drop detection for the nozzle at least in that the function is based on a number of preceding samples between the current results of the drop detection for the nozzle and a most recent time the drop detection for the nozzle indicated that the nozzle was out.

9. The method of claim 1, wherein predicting the nozzle failure is dependent on a location of the nozzle within the printhead.

10. The method of claim 1, wherein the printhead is a first printhead of the 3D printer, and the 3D printer also has a second printhead, wherein the method further comprises predicting a nozzle failure of a nozzle in the second printhead, and wherein the print quality parameter of the object of the object upon the additive manufacture by the 3D printer is further based on the predicted nozzle failure of the nozzle in the second printhead.

11. A printing apparatus comprising:

a printhead;

a processor;

a storage medium storing instructions that, when executed by the processor, cause the processor to:

before initiating additive manufacture of an object by the printing apparatus in a layer-by-layer process:

use object data for the object to determine printing area coordinates of the object when using the printhead in the additive manufacture of the object in the layer-by-layer process;

determine a nozzle failure likelihood of a nozzle in the printhead corresponding to the printing area coordinates of the object; and determine an object quality parameter of the object upon the additive manufacture thereof by the printing apparatus, based on the nozzle failure likelihood of the nozzle;

in response to determining that the object quality parameter is above a quality threshold, proceed to initiate the additive manufacture of the object by the printing apparatus in the layer-by-layer process in accordance with the object data; and in response to determining that the object quality parameter is below the quality threshold, perform a corrective action instead of proceeding to initiate the additive manufacture of the object by the printing apparatus in the layer-by-layer process in accordance with the object data.

12. The printing apparatus of claim 11, wherein the instructions, when executed by the processor, further cause the processor to, in response to determining that the object quality parameter is below the quality threshold and after performing the corrective action, initiate the additive manufacture of the object by the printing apparatus in the layer-by-layer process in accordance with the object data.

13. The printing apparatus of claim 11, wherein the corrective action is one or more than one:

a change a print location of the object when the object is additively manufactured once the additive manufacture of the object by the printing apparatus in the layer-by-layer process has been initiated;

a maintenance procedure;

user notification; and usage of a redundant nozzle when the object is additively manufactured once the additive manufacture of the object by the printing apparatus in the layer-by-layer process has been initiated.

14. The printing apparatus of claim 11, wherein the instructions, when executed by the processor, further cause the processor to use drop detection data for the nozzle in determining the nozzle failure likelihood, the drop detection data comprising a plurality of drop detection results for the nozzle.

15. The printing apparatus of claim 14, wherein the nozzle failure likelihood is predicted as a maximum of current results of the drop detection results for the nozzle and a function that is based on historical results of the drop detection results for the nozzle.

16. The printing apparatus of claim 15, wherein the function is based on the historical results at least in that the function is based on a number of preceding samples between the current results and a most recent time the drop detection data indicated that the nozzle was out.

17. The printing apparatus of claim 11, wherein the printhead is a first printhead, and the printing apparatus further comprises a second printhead, and wherein the instructions, when executed by the processor, further cause the processor to determine a nozzle failure likelihood of a nozzle in the second printhead corresponding to the printing area coordinates.

18. A non-transitory computer-readable storage medium storing instructions that, when executed by a processor, cause the processor to:

receive object data for an object to be additively manufactured by a three-dimensional (3D) printer having a printhead;

before initiating additive manufacture of the object by the 3D printer in a layer-by-layer process:

predict a nozzle failure of a nozzle in the printhead corresponding to a print location of the object; and determine a print quality parameter of the object upon the additive manufacture by the 3D printer, based on the predicted nozzle failure of the nozzle;

in response to determining that the print quality parameter is above a quality threshold, proceed to initiate the additive manufacture of the object by the 3D printer in the layer-by-layer process in accordance with the object data; and in response to determining that the print quality parameter is below the quality threshold, perform a corrective action instead of proceeding to initiate the additive manufacture of the object by the 3D printer in the layer-by-layer process in accordance with the object data.

19. The non-transitory computer-readable storage medium of claim 18, wherein the nozzle failure is predicted as a maximum of current results of drop detection for the nozzle and a function that is based historical results of the drop detection for the nozzle.

20. The non-transitory computer-readable storage medium of claim 19, wherein the function is based on the historical results of the drop detection for the nozzle at least in that the function is based on a number of preceding samples between the current results of the drop detection for the nozzle and a most recent time the drop detection for the nozzle indicated that the nozzle was out.

* * * * *